United States Patent
Miura et al.

(10) Patent No.: US 9,832,334 B2
(45) Date of Patent: Nov. 28, 2017

(54) ELECTRONIC APPARATUS, LOG STORING METHOD, AND IMAGE FORMING APPARATUS

(71) Applicants: Shogo Miura, Kanagawa (JP); Toshihiro Hamano, Tokyo (JP)

(72) Inventors: Shogo Miura, Kanagawa (JP); Toshihiro Hamano, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/214,609

(22) Filed: Jul. 20, 2016

(65) Prior Publication Data
US 2017/0034382 A1 Feb. 2, 2017

(30) Foreign Application Priority Data

Jul. 29, 2015 (JP) .................................. 2015-149455
May 31, 2016 (JP) .................................. 2016-109093

(51) Int. Cl.
  *G06K 15/00* (2006.01)
  *H04N 1/00* (2006.01)
  *G06F 1/28* (2006.01)

(52) U.S. Cl.
  CPC ........... *H04N 1/00899* (2013.01); *G06F 1/28* (2013.01); *H04N 2201/0082* (2013.01)

(58) Field of Classification Search
  None
  See application file for complete search history.

(56) References Cited

U.S. PATENT DOCUMENTS

| | | | | |
|---|---|---|---|---|
| 8,726,181 B2* | 5/2014 | Sunagawa | .......... | H04N 1/00344 715/772 |
| 9,285,746 B2* | 3/2016 | Konishi | ................. | G03G 15/55 |
| 2003/0002065 A1* | 1/2003 | Tanaka | ................... | G06K 15/00 358/1.14 |
| 2013/0163032 A1* | 6/2013 | Hamano | ............... | G06F 3/1296 358/1.14 |
| 2015/0043928 A1* | 2/2015 | Konishi | ................. | G03G 15/55 399/36 |

FOREIGN PATENT DOCUMENTS

JP 2004-249667 9/2004

* cited by examiner

*Primary Examiner* — Dung Tran
(74) *Attorney, Agent, or Firm* — IPUSA, PLLC

(57) ABSTRACT

An electronic apparatus includes a processor for which log information is obtained, a signal monitor configured to monitor monitored signals and detect a change in a changed monitored signal of the monitored signals, and a data acquirer configured to capture groups of signals associated with the monitored signals. The monitored signals include signals for controlling a start of the processor and signals indicating status of power supply to the electronic apparatus. When the change in the changed monitored signal is detected by the signal monitor, the data acquirer stores values of one of the groups of signals associated with the changed monitored signal as a portion of the log information in a storage device.

14 Claims, 15 Drawing Sheets

FIG.6

| SIGNAL GROUP NAME | MONITORED SIGNAL | SIGNAL NAMES |
|---|---|---|
| SIGNAL GROUP A | ENGINE START REQUEST SIGNAL | ENGINE START REQUEST SIGNAL, VOLTAGE SIGNAL V1 (ANALOG SIGNAL) |
| SIGNAL GROUP B | ENGINE SUSPENSION SIGNAL | ENGINE SUSPENSION SIGNAL, VOLTAGE SIGNAL V2 (ANALOG SIGNAL), ENGINE START REQUEST SIGNAL |
| SIGNAL GROUP C | VOLTAGE SIGNAL V1 | VOLTAGE SIGNAL V1 (DIGITAL SIGNAL), VOLTAGE SIGNAL V1 (ANALOG SIGNAL) |
| SIGNAL GROUP D | VOLTAGE SIGNAL V2 | VOLTAGE SIGNAL V2 (DIGITAL SIGNAL), VOLTAGE SIGNAL V2 (ANALOG SIGNAL), VOLTAGE SIGNAL V1 (ANALOG SIGNAL) |

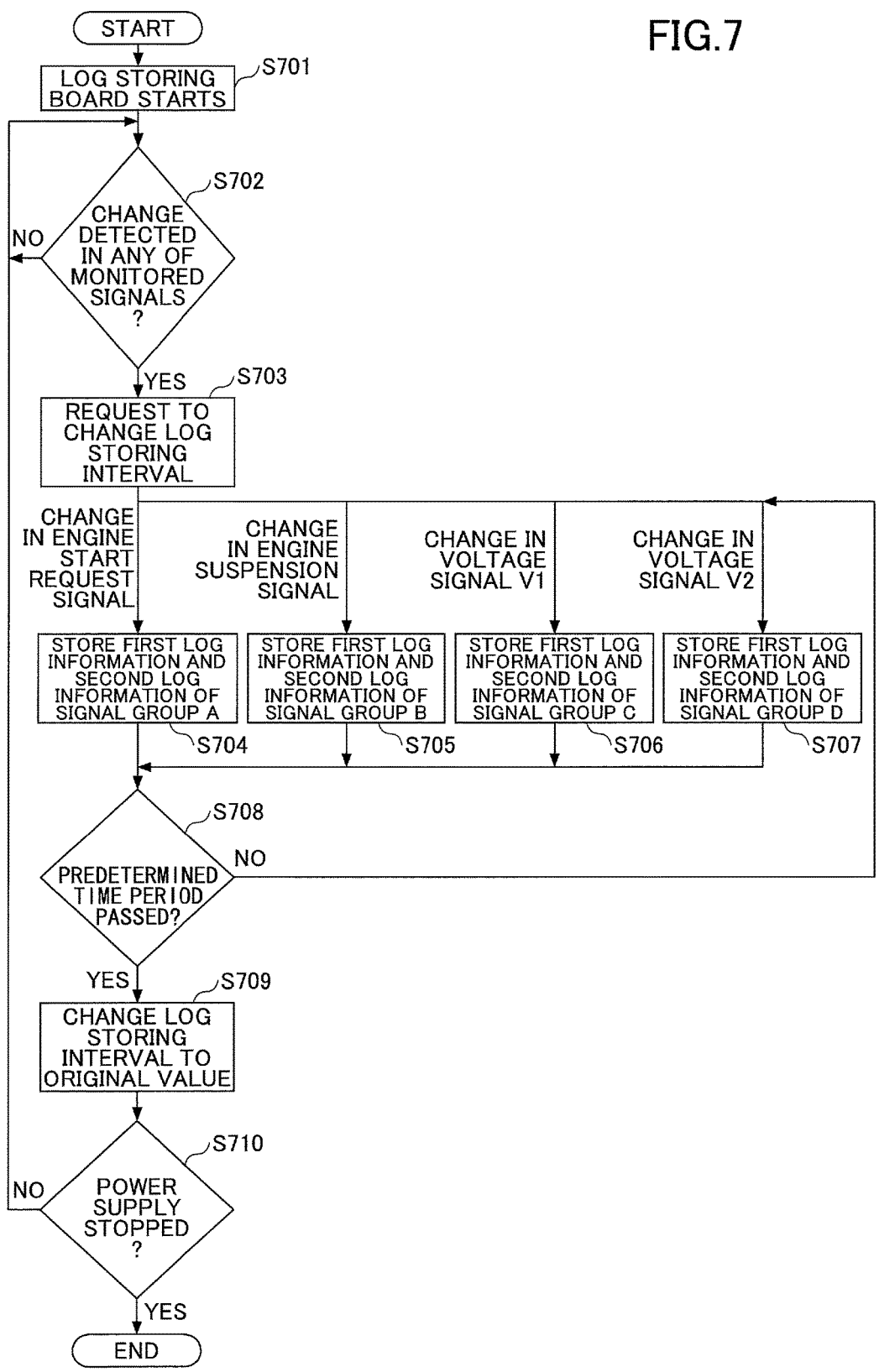

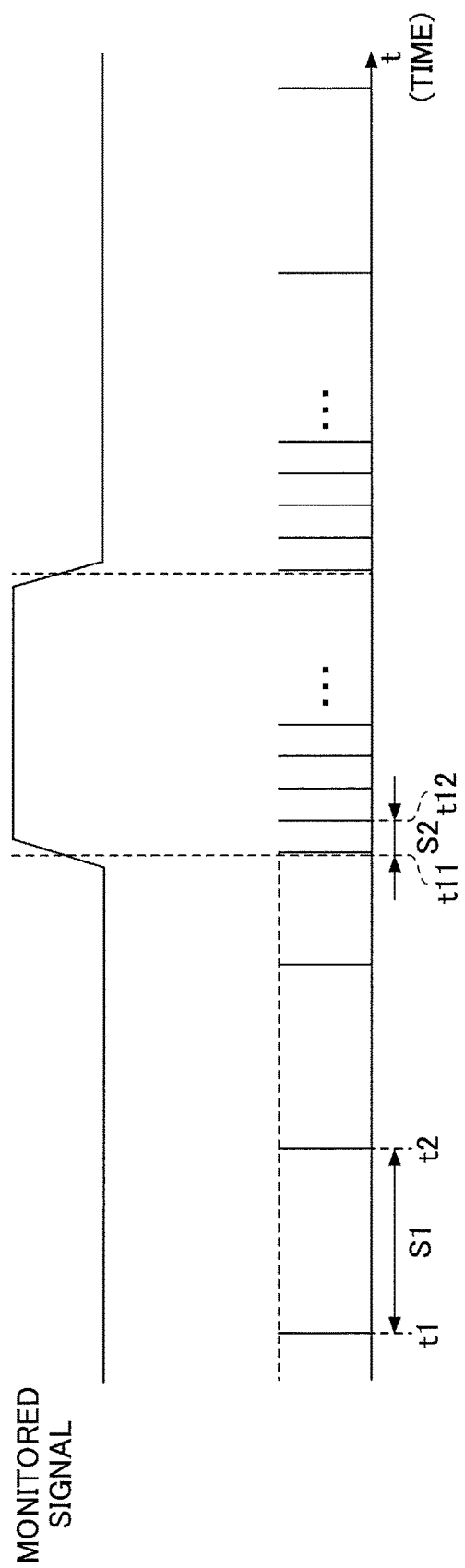

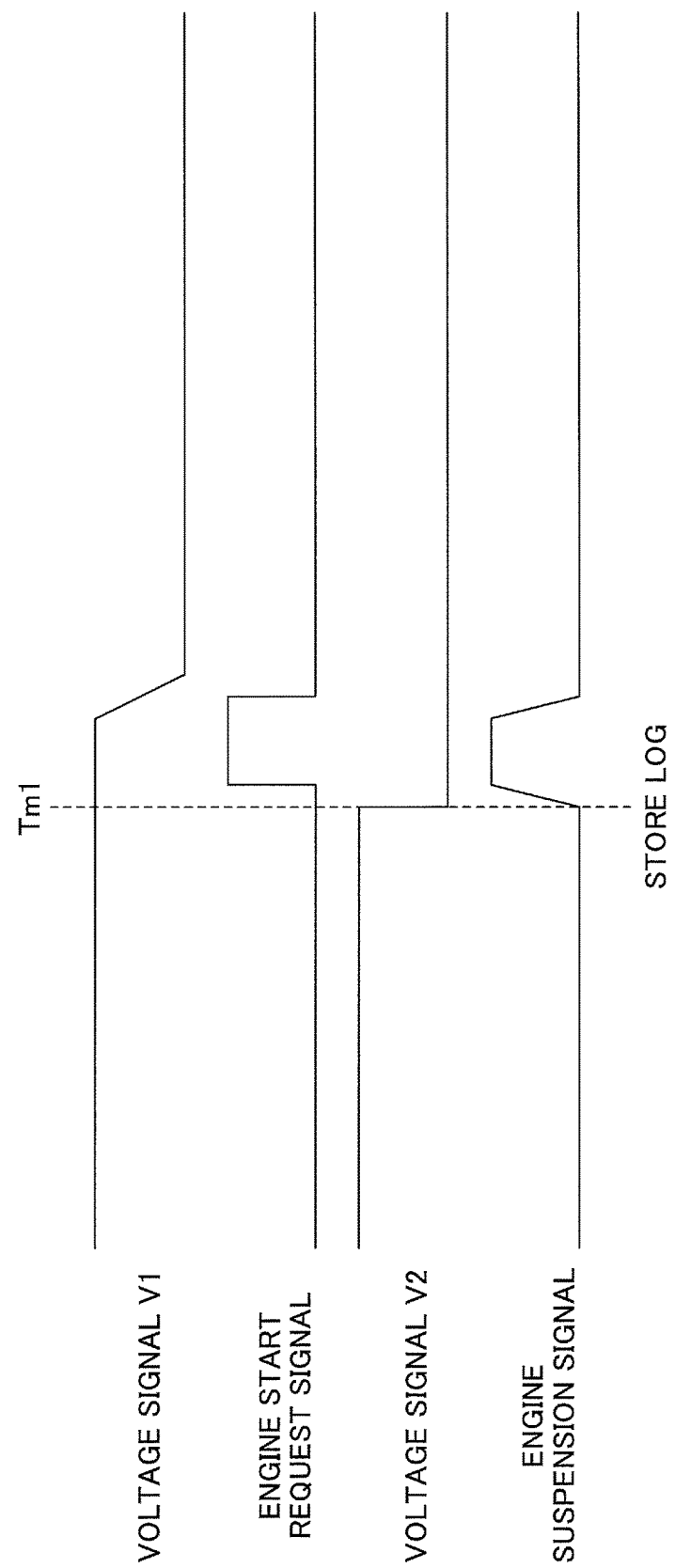

ELECTRONIC APPARATUS, LOG STORING METHOD, AND IMAGE FORMING APPARATUS

CROSS-REFERENCE TO RELATED APPLICATIONS

The present application claims priority under 35 U.S.C. §119 to Japanese Patent Application No. 2015-149455, filed on Jul. 29, 2015 and Japanese Patent Application No. 2016-109093, filed on May 31, 2016. The contents of which are incorporated herein by reference in their entirety.

BACKGROUND OF THE INVENTION

1. Field of the Invention

The present disclosure relates to an electronic apparatus, a log storing method, and an image forming apparatus.

2. Description of the Related Art

There exists a technology for obtaining a log of an engine of an electronic apparatus such as an image forming apparatus and storing the log in a nonvolatile memory to enable analysis of circumstances before and after the occurrence of an error or trouble in the engine (see, for example, Japanese Unexamined Patent Application Publication No. 2004-249667).

SUMMARY OF THE INVENTION

According to one aspect of the present invention, an electronic apparatus includes a processor for which log information is obtained, a signal monitor configured to monitor monitored signals and detect a change in a changed monitored signal of the monitored signals, and a data acquirer configured to capture groups of signals associated with the monitored signals. The monitored signals include signals for controlling a start of the processor and signals indicating status of power supply to the electronic apparatus. When the change in the changed monitored signal is detected by the signal monitor, the data acquirer stores values of one of the groups of signals associated with the changed monitored signal as a portion of the log information in a storage device.

BRIEF DESCRIPTION OF THE DRAWINGS

FIG. 6 is a table illustrating exemplary signal groups;

FIG. 7 is a flowchart illustrating an exemplary process of storing log information according to the first embodiment;

FIG. 8 is a timing chart illustrating an exemplary log storing interval according the first embodiment;

FIG. 9 is a timing chart illustrating an exemplary closing process;

DESCRIPTION OF THE EMBODIMENTS

An aspect of this disclosure makes it possible to obtain log information that is useful for analyzing circumstances where trouble has occurred.

Embodiments of the present invention are described below with reference to the accompanying drawings.

First Embodiment

Figure 1:
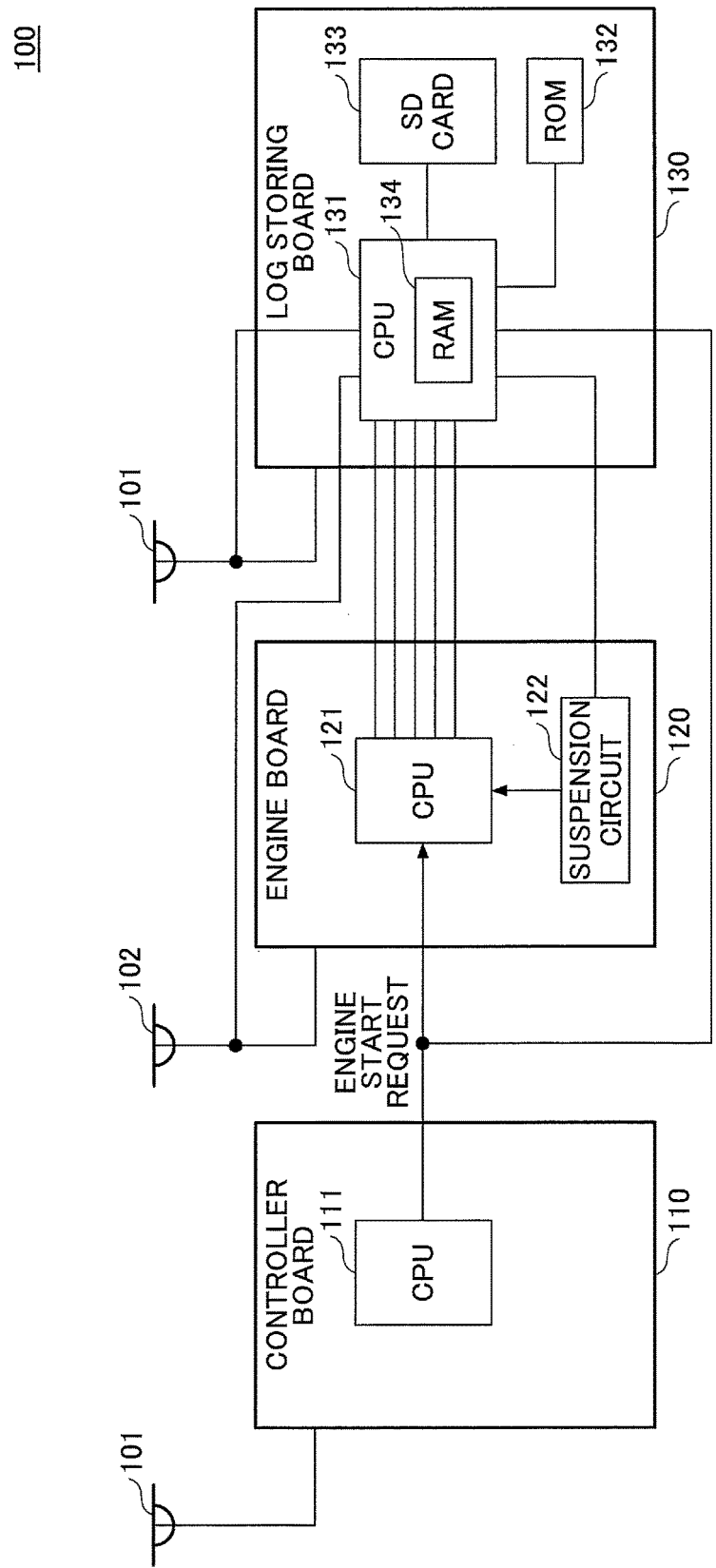
FIG. 1 is a diagram illustrating an exemplary configuration of an electronic apparatus according to a first embodiment.

FIG. 1 is a diagram illustrating an exemplary configuration of an electronic apparatus 100 according to a first embodiment.

The electronic apparatus 100 may include a controller board 110, an engine board 120, and a log storing board 130.

The log storing board 130 obtains log information from the engine board 120 and stores the log information. The log storing board 130 may include a central processing unit (CPU) 131, and in response to a change in a predetermined signal, stores values of signals supplied from the controller board 110 to the engine board 120 and changes in voltages of power supply lines as parts of log information.

Thus, the present embodiment makes it possible to obtain even information on trouble occurred in components of the electronic apparatus 100 other than the engine board 120 and trouble occurred while the engine board 120 is not in operation. That is, the present embodiment makes it possible to obtain log information that is useful for analyzing circumstances where trouble has occurred.

The electronic apparatus 100 of the present embodiment is, for example, an image forming apparatus. In the descriptions below, the electronic apparatus 100 may be referred to as an image forming apparatus 100.

The controller board 110 may include a CPU 111 and controls, for example, an operations panel of the image forming apparatus 100. For example, the controller board 110 receives an operation performed on the operations panel, and requests the engine board 120 to execute a process corresponding to the received operation. Also, the controller board 110 requests the engine board 120 to start.

The engine board 120 may include a CPU 121 and a suspension (reset) circuit 122. When the operations panel is operated, the engine board 120 receives an engine start request from the controller board 110 and starts in response to the engine start request.

The engine board 120, under the control of the CPU 121, implements various image forming functions of the image forming apparatus 100. The suspension circuit 122 initializes (or resets) the CPU 121 and suspends the operation of the CPU 121 according to an engine suspension signal. The engine suspension signal is output by the CPU 131 of the log storing board 130 and input to the suspension circuit 122 of the engine board 120.

The suspension circuit 122 suspends the operation of the CPU 121 when the engine suspension signal is at the high level (H level), and cancels the suspension of the CPU 121 when the engine suspension signal is at the low level (L level).

The log storing board 130 may include the CPU 131, a read-only memory (ROM) 132, and a secure digital (SD) card 133. The CPU 131 includes a random access memory (RAM) 134.

The ROM 132 is a rewritable nonvolatile memory that stores programs and data for causing the image forming apparatus 100 to operate. The RAM 134 temporarily stores log information. In the present embodiment, log information may include first log information and second log information. The first log information includes, for example, a history of communications between the engine board 120 and other boards and a history of operations of the engine board 120. The second log information, for example, includes values of signals supplied to the CPU 131 of the log storing board 130 and changes in voltages of power supply lines.

The CPU 131 of the log storing board 130 obtains log information from the CPU 121 of the engine board 120, and stores the obtained log information in the SD card 133. Thus, the CPU 121 of the engine board 120 is an example of a target processor whose log information is to be obtained.

In the present embodiment, the SD card 133 is used as an example of a storage medium for storing log information. However, any other nonvolatile storage medium removable from the image forming apparatus 100 may also be used to store log information.

A power source 101 supplies power to the controller board 110 and the log storing board 130. In the present embodiment, power is supplied to the controller board 110 and the log storing board 130 when a power cord of the image forming apparatus 100 is connected to a commercial power supply (i.e., when the power cord is inserted into a socket).

A power source 102 supplies power to the engine board 120. Power is supplied from the power source 102 to the engine board 120 in response to a start request from the controller board 110, and the engine board 120 starts. The engine board 120 is an "active low" board and starts when an L-level engine start request signal is input from the controller board 110.

The CPU 131 of the log storing board 130 monitors four signals including an engine start request signal, an engine suspension signal, a voltage signal V1 indicating a voltage of a power supply line of the power source 101, and a voltage signal V2 indicating a voltage of a power supply line of the power source 102. These four signals are supplied to the CPU 131. In the descriptions below, the four signals to be monitored are referred to as "monitored signals".

The engine start request signal and the engine suspension signal are related to starting of the CPU 121 of the engine board 120. That is, the engine start request signal and the engine suspension signal are signals for controlling the start of a target processor whose log information is to be obtained. In still other words, the engine start request signal and the engine suspension signal are signals supplied from the controller board 110 to the engine board 120.

The voltage signal V1 and the voltage signal V2 indicate the status of power supply to the CPU 121 of the engine board 120. That is, the voltage signal V1 and the voltage signal V2 indicate the status of power supply to a target processor whose log information is to be obtained. In still other words, the voltage signal V1 and the voltage signal V2 indicate changes in voltages of power supply lines for supplying power to the controller board 110, the engine board 120, and the log storing board 130.

In the image forming apparatus 100, trouble (or errors) in communications between the engine board 120 and other boards may occur when, for example, the image forming apparatus 100 is not powered on or the engine board 120 is not powered on. Also, trouble in communications may occur when the engine start request signal is not sent to the engine board 120 or when the suspension of the engine board 120 is not canceled.

In the present embodiment, taking into account the above causes of trouble, the log storing board 130 is configured to monitor the voltage signal V1 indicating a voltage of the power supply line of the power source 101 for supplying power to the controller board 110 and the log storing board 130, and the voltage signal V2 indicating a voltage of the power supply line of the power source 102 for supplying power to the engine board 120. The log storing board 130 is also configured to monitor the engine start request signal supplied from the controller board 110 to the engine board 120, and the engine suspension signal supplied from the log storing board 130 to the engine board 120.

When a change in a monitored signal (a changed monitored signal) is detected, the CPU 131 of the log storing board 130 captures signals in a preset signal group associated with the changed monitored signal. A signal group is preset for each of the four monitored signals. Then, the CPU 131 stores values of the captured signals as second log information.

After detecting a change in a monitored signal, the CPU 131 shortens a log storing interval at which log information is obtained and stored. The log storing interval may be either a regular interval or an irregular interval. Details of processes performed by the CPU 131 and signal groups are described later.

As described above, in the present embodiment, four signals are monitored so that trouble related to the engine board 120 but resulting from signals supplied from other boards or the supply of power and trouble occurred within the engine board 120 can be separately analyzed. This in turn makes it possible to improve the accuracy of analyzing trouble based on log information.

Although four monitored signals are used in the present embodiment, the number and types of monitored signals are not limited to those described above. Any signal may be monitored as long as the signal contributes to improving the accuracy of analyzing trouble based on log information.

Figure 2:
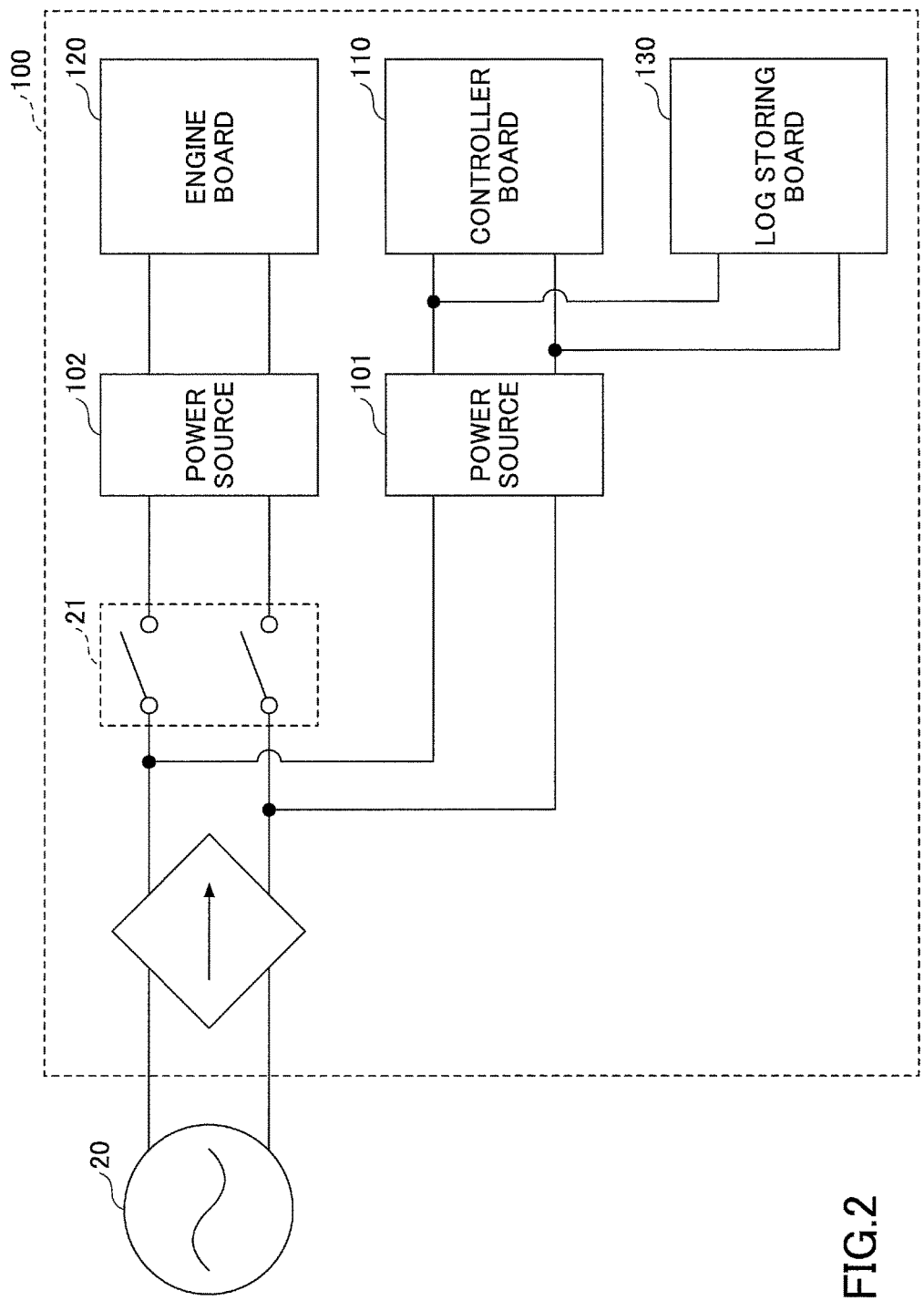
FIG. 2 is a diagram illustrating exemplary power sources.

Next, the power source 101 and the power source 102 of the present embodiment are described with reference to FIG. 2. FIG. 2 is a diagram illustrating the power sources 101 and 102.

The electronic apparatus 100 of the present embodiment includes the power sources 101 and 102. Each of the power sources 101 and 102 is supplied with power by a commercial power supply 20.

The power source 101 is continuously connected to the commercial power supply 20. Power is supplied to the power source 101 when, for example, the power cord of the image forming apparatus 100 is connected to the commercial power supply 20. Accordingly, as long as the power cord of the image forming apparatus 100 is connected to the commercial power supply 20, power is supplied from the power source 101 to the controller board 110 and the log storing board 130.

The power source 102 is connected via a switch 21 to the commercial power supply 20. The switch 21 is, for example, a hardware switch for turning on and off the image forming apparatus 100. Accordingly, power is supplied from the power source 102 to the engine board 120 when the switch 21 is on, and the supply of power to the engine board 120 is stopped when the switch 21 is off.

Figure 3:
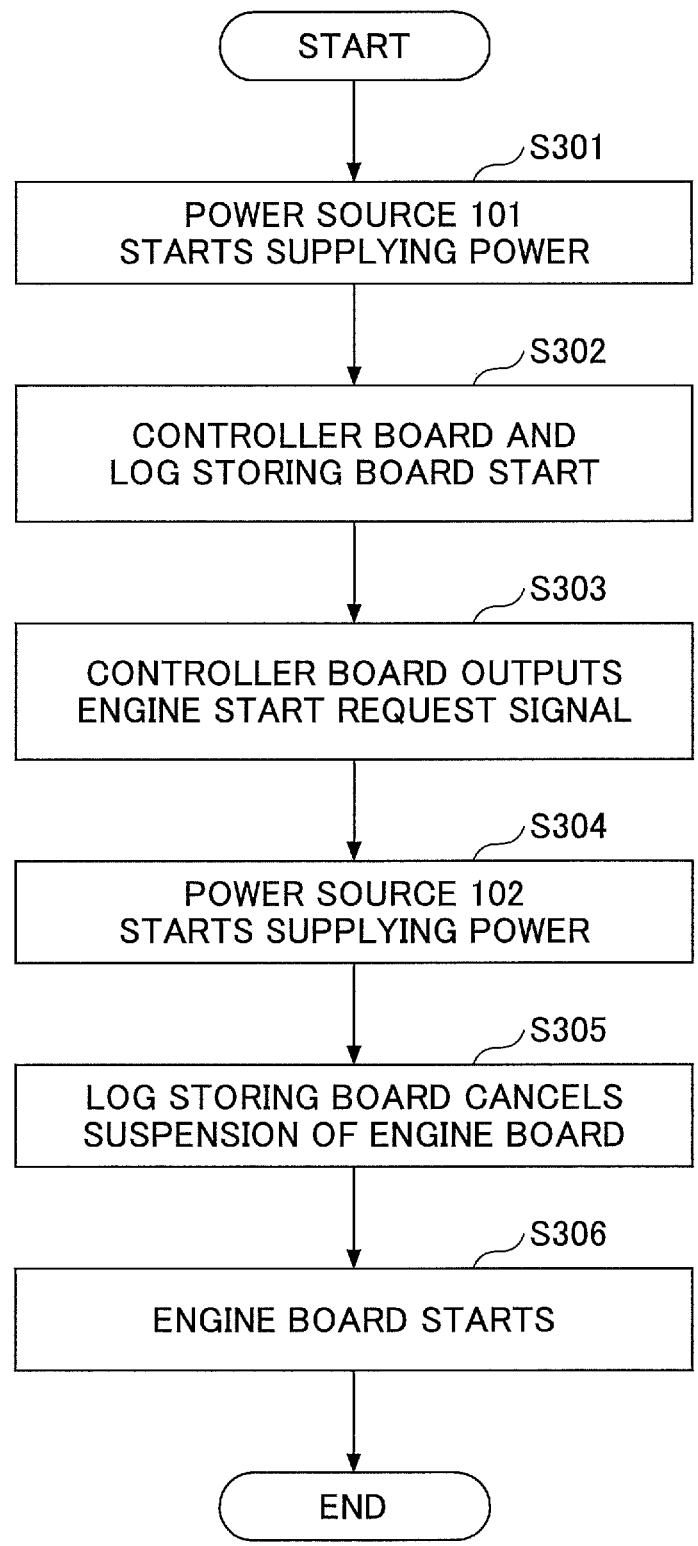
FIG. 3 is a flowchart illustrating an exemplary process of starting boards.

Next, an exemplary process of starting the boards 110, 120, and 130 of the image forming apparatus 100 is described with reference to FIGS. 3 and 4. FIG. 3 is a flowchart illustrating an exemplary process of starting the boards 110, 120, and 130.

When the power cord of the image forming apparatus 100 is connected to the commercial power supply 20, the power source 101 starts supplying power to the controller board 110 and the log storing board 130 (step S301).

When the supply of power from the power source 101 is started, the controller board 110 and the log storing board 130 start (step S302).

Next, the controller board 110 outputs an engine start request signal to the engine board 120 (step S303). The engine start request signal is output when the voltage applied to the controller board 110 reaches a predetermined value.

When the engine start request signal is output, the power source 102 starts supplying power to the engine board 120 (step S304). Next, the log storing board 130 cancels the suspension imposed by the suspension circuit 122 on the engine board 120 (step S305). When the suspension imposed by the suspension circuit 122 is canceled, the engine board 120 starts (step S306).

Figure 4:
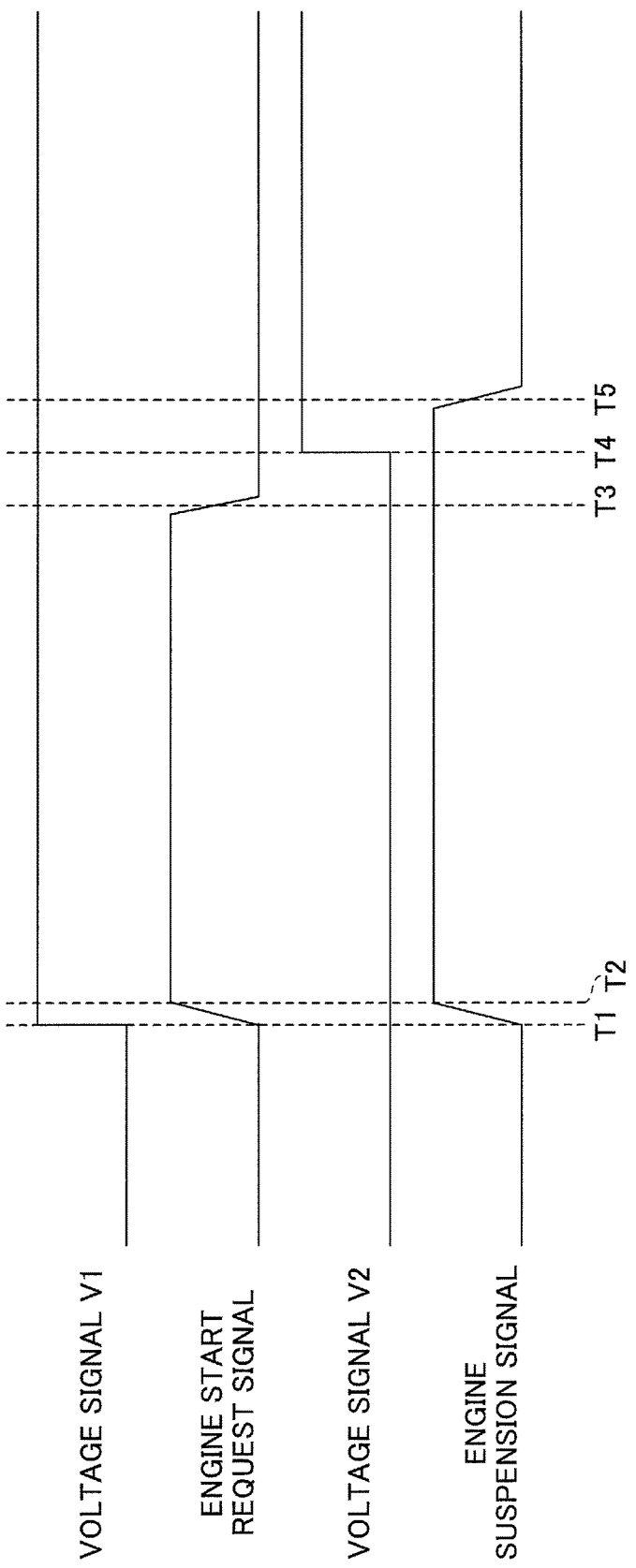
FIG. 4 is a timing chart illustrating an exemplary sequence of starting boards.

FIG. 4 is a timing chart illustrating an exemplary sequence of starting the boards 110, 120, and 130. In FIG. 4, at a time T1, the voltage signal V1 of the power source 101 changes to the H level, and the supply of power from the power source 101 is started.

Next, at a time T2, the controller board 110 outputs an H-level engine start request signal. In the present embodiment, the engine board 120 is started when the engine start request signal changes to the L level. Also at the time T2, the log storing board 130 outputs an H-level engine suspension signal. Accordingly, at the time T2, the engine board 120 is not in operation and the CPU 121 is suspended.

Next, at a time T3, the voltage applied to the controller board 110 reaches a predetermined value, and the engine start request signal changes to the L level.

When the engine start request signal changes to the L level, the voltage signal V2 of the power source 102 changes to the H level at a time T4, and the supply of power from the power source 102 to the engine board 120 is started.

After the supply of power to the engine board 120 is started, at a time T5, the log storing board 130 causes the engine suspension signal to change to the L level.

The engine board 120 starts at the time T5 at which the engine suspension signal changes to the L level.

In the example of FIG. 4, it is assumed that the engine board 120 is an "active low" board, and the suspension circuit 122 suspends the CPU 121 while the engine suspension signal is at the H level, and cancels the suspension of the CPU 121 when the engine suspension signal is at the L level.

When the engine board 120 is not an "active low" board, the suspension circuit 122 suspends the CPU 121 while the engine suspension signal is at the L level, and cancels the suspension of the CPU 121 when the engine suspension signal is at the H level. In this case, the H and L levels of the engine suspension signal and the engine start request signal in FIG. 4 are inverted.

Next, functional components implemented by the CPU 131 of the log storing board 130 of the first embodiment are described with reference to FIG. 5.

Figure 5:
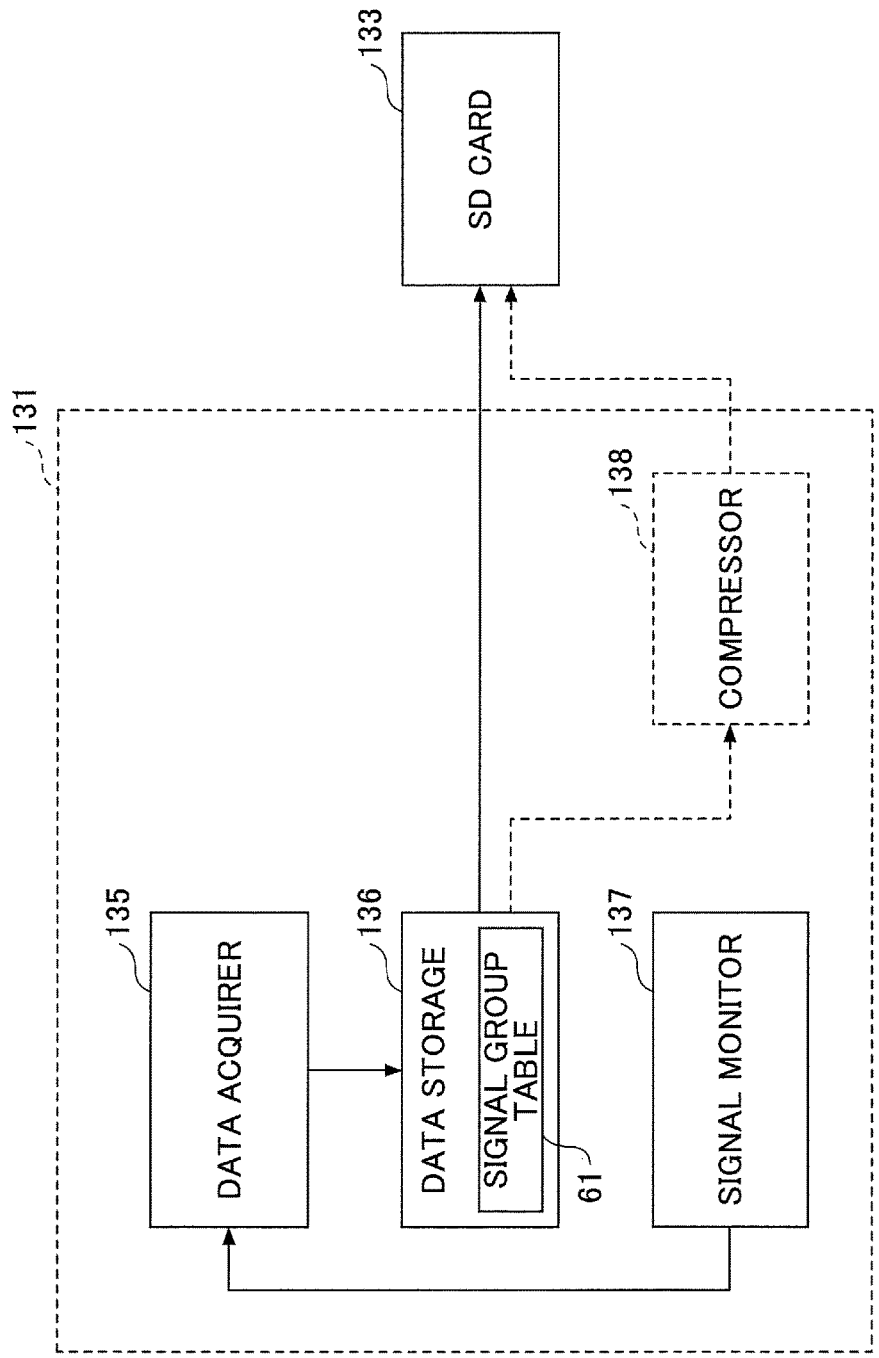
FIG. 5 is a block diagram illustrating functional components implemented by a CPU of a log storing board according to the first embodiment.

The functional components illustrated in FIG. 5 are implemented by executing a program stored in the ROM 132 by the CPU 131.

The CPU 131 implements a data acquirer 135, a data storage 136, a signal monitor 137, and a compressor 138.

The data acquirer 135 obtains log information at a predetermined log storing interval. Details of a process performed by the data acquirer 135 are described later. Log information obtained by the data acquirer 135 includes values of signals in a preset signal group described later. In other words, log information obtained by the data acquirer 135 includes first log information and second log information.

The data storage 136 temporarily stores the log information obtained by the data acquirer 135. The log information temporarily stored in the data storage 136 is written into the SD card 133. The data storage 136 also stores a signal group table 61 that associates monitored signals with preset signal groups (groups of signals). The data storage 136 may be implemented by the RAM 134 in FIG. 1.

The signal monitor 137 monitors four signals including the engine start request signal, the engine suspension signal, the voltage signal V1 of the power source 101, and the voltage signal V2 of the power source 102. Also, when a change in any one of the four monitored signals is detected, the signal monitor 137 reports the detection of the change to the data acquirer 135 and requests the data acquirer 135 to change the log storing interval.

The compressor 138 compresses log information temporarily stored in the data storage 136. The compressor 138 may be configured to determine whether to compress log information in the data storage 136 based on the size of the log information.

When the detection of the change in a monitored signal (a changed monitored signal) is reported, the data acquirer 135 refers to the signal group table 61 stored in the data storage 136. Then, at the log storing interval, the data acquirer 135 captures signals in a signal group associated with the changed monitored signal, and stores values of the captured signals as second log information in the data storage 136 together with first log information.

Next, signal groups are described with reference to FIG. 6. FIG. 6 is an example of the signal group table 61.

The signal group table 61 may include "signal group name", "monitored signal", and "signal names" as information items. The "signal group name" indicates the name of each signal group. The "monitored signal" indicates the name of each monitored signal. The "signal names" indicates the names of signals whose values are to be obtained and stored.

For example, when the detection of a change in the engine start request signal 6f the monitored signals is reported, the data acquirer 135 captures signals with signal names associated with a signal group A. The signals in the signal group A are expected to change in response to the change in the engine start request signal.

More specifically, when a change in the engine start request signal is detected, the data acquirer 135 captures the engine start request signal and the voltage signal V1 (analog signal) of the power source 101. Thus, in the present embodiment, when a change in the engine start request signal is detected, the voltage signal V1 (analog signal) of the power source 101 is captured and the value of the captured voltage signal V1 is stored. This makes it possible to determine whether the voltage output from the power source 101 was unstable. The value of the voltage signal V1 (analog signal) indicates an analog value of the voltage output from the power source 101.

When a change in the engine suspension signal is detected, the data acquirer 135 captures signals with signal names associated with a signal group B. The signals in the signal group B are expected to change in response to the change in the engine suspension signal.

More specifically, when a change in the engine suspension signal is detected, the data acquirer 135 captures the engine suspension signal, the voltage signal V2 (analog signal) of the power source 102, and the engine start request signal.

Storing the value of the captured voltage signal V2 (analog signal) of the power source 102 makes it possible to determine whether the voltage output from the power source 102 was unstable when the engine suspension signal changed. The value of the voltage signal V2 (analog signal) indicates an analog value of the voltage output from the power source 102. Also, storing the value of the captured engine start request signal makes it possible to determine whether a start request was sent to the engine board 120 when the engine suspension signal changed.

When a change in the voltage signal V1 of the power source 101 is detected, the data acquirer 135 captures signals with signal names associated with a signal group C. The signals in the signal group C are expected to change in response to the change in the voltage signal V1.

More specifically, when a change in the voltage signal V1 of the power source 101 is detected, the data acquirer 135 captures the voltage signal V1 (digital signal) of the power source 101 and the voltage signal V1 (analog signal) of the power source 101. The voltage signal V1 (digital signal) is obtained by binarizing the voltage output from the power source 101.

Storing the value of the captured voltage signal V1 (digital signal) and the value of the captured voltage signal V1 (analog signal) makes it possible to determine the state of the power source 101 at the time when the voltage signal V1 changed.

When a change in the voltage signal V2 of the power source 102 is detected, the data acquirer 135 captures signals with signal names associated with a signal group D. The signals in the signal group D are expected to change in response to the change in the voltage signal V2.

More specifically, when a change in the voltage signal V2 of the power source 102 is detected, the data acquirer 135 captures the voltage signal V2 (digital signal) of the power source 102, the voltage signal V2 (analog signal) of the power source 102, and the voltage signal V1 (analog signal) of the power source 101. Capturing these three signals and storing the values of the signals in response to a change in the voltage signal V2 of the power source 102 make it possible to determine the state of the power source 102. For example, with the stored values, it is possible to determine whether the supply of power from the power source 102 to the engine board 120 was stopped due to a problem in the power source 102 itself or due to a problem in the power source 101.

As described above, in the present embodiment, when a change is detected in a monitored signal (a changed monitored signal) of the four monitored signals, the changed monitored signal and one or more of the other monitored signals that possibly change in association with the monitored signal are captured as the corresponding group of signals. That is, in the present embodiment, information indicating changes in a monitored signal and a group of signals corresponding to the monitored signal are obtained as second log information.

Next, an exemplary process performed by the CPU 131 to store log information is described with reference to FIG. 7. FIG. 7 is a flowchart illustrating an exemplary process of storing log information according to the first embodiment.

When the log storing board 130 starts (step S701), the data acquirer 135 implemented by the CPU 131 starts obtaining log information. At this stage, the data acquirer 135 obtains only first log information.

Next, the signal monitor 137 implemented by the CPU 131 determines whether a change is detected in any one of the four monitored signals (step S702). Here, a change in a monitored signal indicates, for example, an event where the monitored signal changes from the H level to the L level, the output of the monitored signal is stopped, the output of the monitored signals is started, or the value of the monitored signal changes.

When no change is detected in any of the monitored signals at step S702, the signal monitor 137 repeats step S702.

When a change is detected in a monitored signal (a changed monitored signal) of the monitored signals at step S702, the signal monitor 137 requests the data acquirer 135 to change the log storing interval (step S703).

When the changed monitored signal is the engine start request signal, the data acquirer 135 captures signals in the signal group A according to the signal group table 61. The data acquirer 135 stores values of the captured signals as second log information in the data storage 136 together with the first log information obtained from the engine board 120. The first log information and the second log information temporarily stored in the data storage 136 are then stored in the SD card 133 (step S704). Then, the data acquirer 135 proceeds to step S708.

When the changed monitored signal is the engine suspension signal, the data acquirer 135 captures signals in the signal group B according to the signal group table 61. The data acquirer 135 stores values of the captured signals as second log information in the data storage 136 together with the first log information obtained from the engine board 120. The first log information and the second log information temporarily stored in the data storage 136 are then stored in the SD card 133 (step S705). Then, the data acquirer 135 proceeds to step S708.

When the changed monitored signal is the voltage signal V1 of the power source 101, the data acquirer 135 captures signals in the signal group C according to the signal group table 61. The data acquirer 135 stores values of the captured signals as second log information in the data storage 136 together with the first log information obtained from the engine board 120. The first log information and the second log information temporarily stored in the data storage 136 are then stored in the SD card 133 (step S706). Then, the data acquirer 135 proceeds to step S708. Here, the data acquirer 135 captures signals in the signal group C when a change is detected in at least one of the digital signal and the analog signal of the voltage signal V1.

When the changed monitored signal is the voltage signal V2 of the power source 102, the data acquirer 135 captures signals in the signal group D according to the signal group table 61. The data acquirer 135 stores values of the captured signals as second log information in the data storage 136 together with the first log information obtained from the engine board 120. The first log information and the second log information temporarily stored in the data storage 136 are then stored in the SD card 133 (step S707). Then, the data acquirer 135 proceeds to step S708. Here, the data acquirer 135 captures signals in the signal group D when a change is detected in at least one of the digital signal and the analog signal of the voltage signal V2.

At step S708, the data acquirer 135 determines whether a predetermined time period has passed. The predetermined time period indicates time taken by the data acquirer 135 to obtain log information a predetermined number of times at the changed log storing interval. The predetermined time period is describe later in more detail.

When it is determined at step S708 that the predetermined time period has not passed, the data acquirer 135 repeats one of steps S704 through S707 corresponding to the changed monitored signal whose change is detected at step S702.

When it is determined at step S708 that the predetermined time period has passed, the data acquirer 135 changes the log storing interval back to the original value (step S709). After this, the data acquirer 135 may obtain only first log information.

Next, the CPU 131 determines whether the supply of power to the log storing board 130 has been stopped (step S710). When it is determined at step S710 that the supply of power has not been stopped, the CPU 131 returns to step S702. When it is determined at step S710 that the supply of power has been stopped, the CPU 131 ends the process.

The log storing interval is described with reference to FIG. 8. FIG. 8 is a timing chart illustrating an exemplary log storing interval according the first embodiment.

In FIG. 8, it is assumed that a change is detected in one of the four monitored signals at a time t11.

When a change in a monitored signal is detected, the data acquirer 135 changes the log storing interval at which log information is obtained. More specifically, when a change in a monitored signal is detected, the data acquirer 135 makes the log storing interval shorter than that used in a normal condition. Here, the normal condition indicates a condition where no change is detected in any of the monitored signals.

In FIG. 8, when the duration between a time t1 and a time t2 is a log storing interval S1 used in the normal condition, a log storing interval S2 used after a change is detected in a monitored signal is represented by the duration between the time t11 and a time t12.

After a change in a monitored signal is detected, the data acquirer 135 obtains log information a predetermined number of times at the log storing interval S2, and then changes the log storing interval S2 back to the log storing interval S1.

For example, when the log storing interval S1 is 500 ms, the log storing interval S2 may be set at 1 ms. Also as an example, the data acquirer 135 may change the log storing interval S2 back to the log storing interval S1 after obtaining log information 20 times at the log storing interval S2.

As described above, in the present embodiment, the log storing interval is set at a shorter value for a predetermined time period after a change in a monitored signal is detected. Also in the present embodiment, changes in signals supplied from the controller board 110 to the engine board 120 and changes in voltages of power supply lines are included in log information only during a predetermined time period from the time when a change in a monitored signal is detected. This configuration makes it possible to obtain log information that is useful for analyzing circumstances at a point of time when a change in a monitored signal occurred.

Also in the present embodiment, the log storing interval is shortened only during a predetermined time period from a point of time when a change in a monitored signal occurred. This makes it possible to prevent the amount of obtained log information from becoming unnecessarily large.

Next, an exemplary closing process is described with reference to FIG. 9. FIG. 9 is a timing chart illustrating an exemplary closing process.

The image forming apparatus 100 performs a closing process when the supply of power is unexpectedly stopped by, for example, pulling the power cord out of the socket. In the present embodiment, the image forming apparatus 100 is configured such that when the supply of power from the commercial power supply 20 is stopped, the voltage signal V2 of the power source 102 falls first, and then the voltage signal V1 of the power source 101 falls.

In FIG. 9, the supply of power from the commercial power supply 20 is unexpectedly stopped at a time Tm1.

At the time Tm1, the voltage signal V2 of the power source 102 changes from the H level to the L level. When the voltage signal V2 changes to the L level, the engine suspension signal is fixed at the H level and the CPU 121 is suspended.

When the supply of power by the power source 102 is stopped, the engine start request signal changes from the L level to the H level.

Then, the voltage signal V1 of the power source 101 starts to fall. When the voltage signal V1 changes from the H level to the L level, the controller board 110 becomes unable to output the engine start request signal and the engine start request signal changes to the L level.

Also when the voltage signal V1 changes from the H level to the L level, the log storing board 130 becomes unable to output the engine suspension signal and the engine suspension signal changes to the L level.

In the present embodiment, the monitored signals are being monitored by the signal monitor 137. At the time Tm 1, the signal monitor 137 detects a change in the voltage signal V2 of the power source 102, and the data acquirer 135 starts capturing signals in the signal group D at the log storing interval S2. The data acquirer 135 continues to obtain and store log information until the supply of power from the power source 101 to the log storing board 130 ends. More specifically, the data acquirer 135 continues to obtain and store log information until the voltage signal V1 of the power source 101 decreases to about 3.3 V.

With the above configuration, even when the supply of power from the commercial power supply 20 is unexpectedly stopped, it is possible to continue storing log information in the SD card 133 without damaging data temporarily stored in the RAM 134 until just before the power supply from the power source 101 ends.

Figure 10:
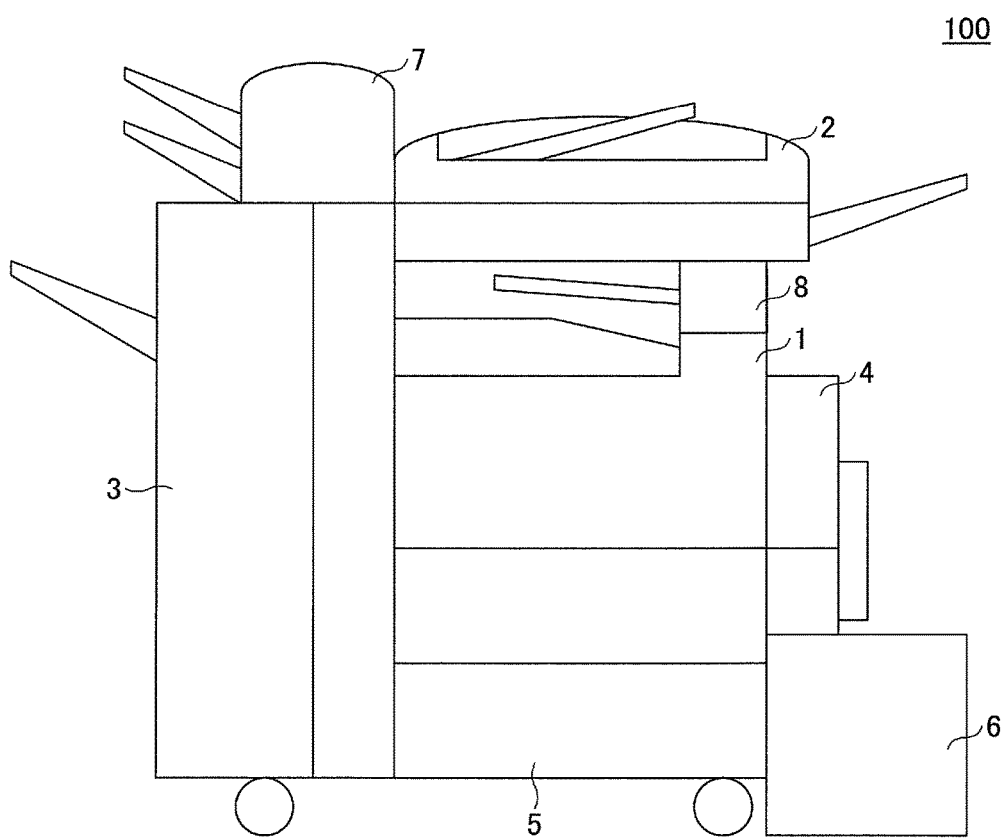
FIG. 10 is a diagram illustrating an exemplary image forming apparatus.

FIG. 10 is a diagram illustrating an example of the image forming apparatus 100. The image forming apparatus 100 is an example of an electronic apparatus including the controller board 110, the engine board 120, and the log storing board 130 of the present embodiment.

The image forming apparatus 100 may include a body 1, an automatic document feeder 2, a finisher 3 including a stapler and a shift tray, a duplex unit 4, an extra paper-feeding tray 5, a large-volume paper-feeding tray LCT 6, a single-bin paper-ejection tray 7, and an insert feeder 8.

The body 1 of the image forming apparatus 100 may include a scanner, a plotter, a writer, a photoconductor, a developer, and a transfer unit that are used for image forming.

As described above, in the present embodiment, the CPU 131 of the log storing board 130 monitors four monitored signals that are closely related to occurrence of trouble in the controller board 110 and the engine board 120. When a change in a monitored signal is detected, a group of signals associated with the monitored signal are captured for a predetermined time period at an interval shorter than a normal interval, and values of the captured signals are stored as log information.

Such log information makes it possible to analyze even trouble of the engine board 120 resulting from trouble of other components. Thus, the present embodiment makes it possible to obtain log information that is useful for analyzing circumstances where trouble has occurred.

In the present embodiment, when a change is detected in a monitored signal, information obtained from the engine board 120 is stored as first log information and values of a group of signals associated with the monitored signal are stored as second log information (see, for example, FIG. 7). However, the present invention is not limited to this embodiment.

For example, when a change is detected in a monitored signal, the log storing board 130 may be configured to stop obtaining first log information from the engine board 120 and obtain only second log information, i.e., values of a group of signals associated with the monitored signal. In this case, after obtaining the second log information for a predetermined time period at the log storing interval S2, the log storing board 130 may restart obtaining only the first log information at the log storing interval S1.

Selecting log information to be obtained as described above makes it possible to prevent the amount of log information stored in the SD card 133 from becoming too large.

In the present embodiment, the CPU 131 for implementing the data acquirer 135, the data storage 136, and the signal monitor 137 is provided in the log storing board 130 that is provided separately from the controller board 110 and the engine board 120. However, the present invention is not limited to this embodiment. For example, the CPU 131 for implementing the data acquirer 135, the data storage 136, and the signal monitor 137 may be provided in the controller board 110 or the engine board 120.

Second Embodiment

A second embodiment is described below with reference to drawings. The second embodiment is different from the first embodiment in that a predetermined amount of log information is stored in the data storage 136, and when a change in a monitored signal is detected, the predetermined amount of log information is transferred to the SD card 133 together with log information that is stored in the data storage 136 after the detection of the change. In the descriptions of the second embodiment below, differences from the first embodiment are mainly discussed. Also, the same reference numbers as those used in the first embodiment are assigned to the corresponding components in the second embodiment, and descriptions of those components are omitted.

Figure 11:
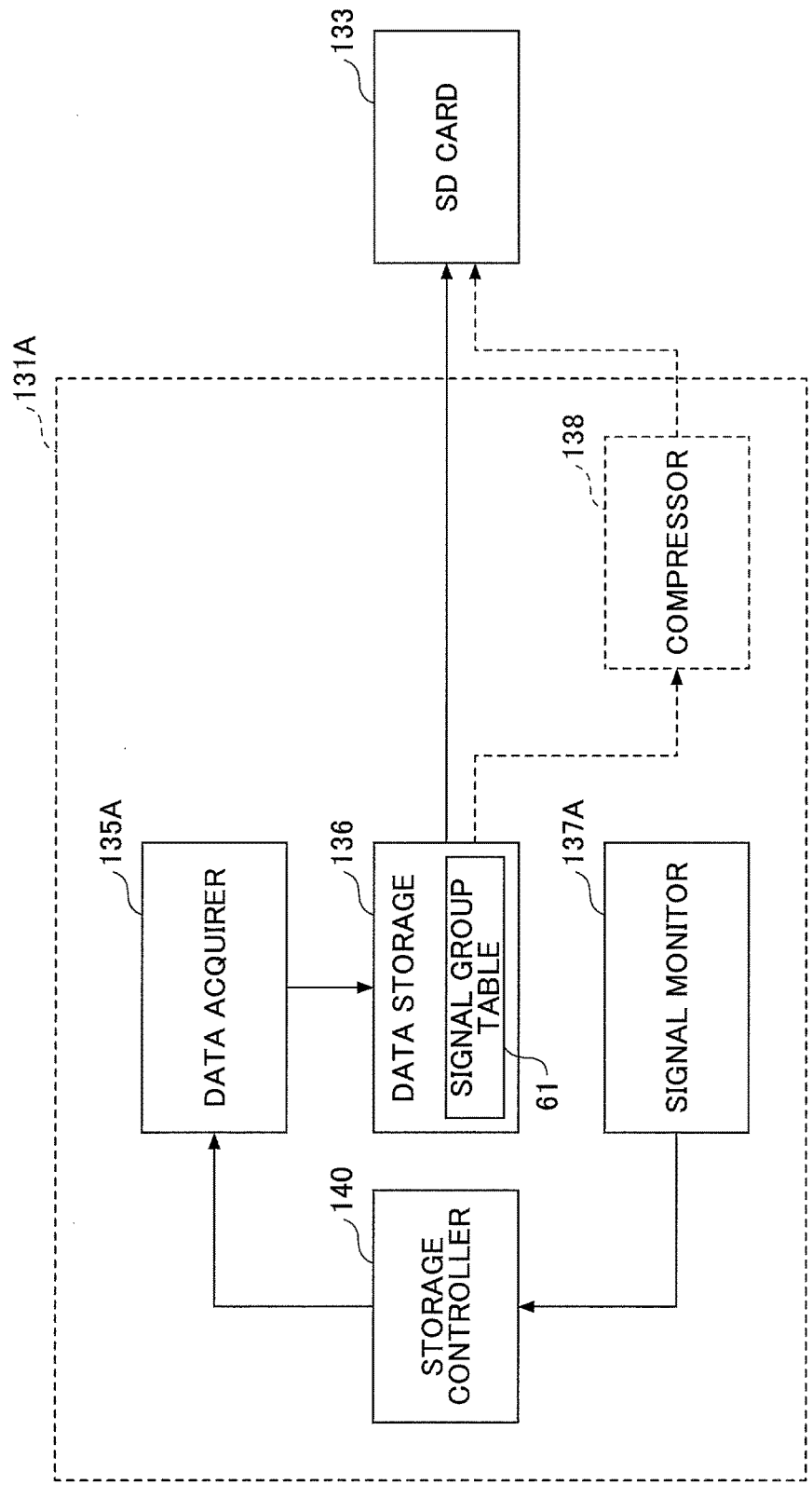
FIG. 11 is a block diagram illustrating functional components implemented by a CPU of a log storing board according to a second embodiment.

FIG. 11 is a block diagram illustrating functional components implemented by a CPU of a log storing board 130 according to the second embodiment. The log storing board 130 of the second embodiment includes a CPU 131A, a ROM 132, and an SD card 133. The functional components illustrated in FIG. 11 are implemented by executing a program stored in the ROM 132 by the CPU 131A.

The CPU 131A implements a data acquirer 135A, a data storage 136, a signal monitor 137A, a compressor 138, and a storage controller 140.

The data acquirer 135A obtains log information at a predetermined log storing interval, and temporarily stores the log information in the data storage 136. The data acquirer 135A may obtain log information at a log storing interval of, for example, 1 ms. Log information obtained by the data acquirer 135A includes first log information and second log information.

When a change in any one of four monitored signals is detected, the signal monitor 137A reports the detection of the change to the storage controller 140.

The storage controller 140 controls storage of log information such that the amount of log information stored in the data storage 136 becomes constant. Also, the storage controller 140 transfers, at a regular interval, only first log information of the log information stored in the data storage 136 to the SD card 133.

Further, when a report indicating detection of a change in a monitored signal is received from the signal monitor 137A, the storage controller 140 transfers, to the SD card 133, log information (first log information and second log information) already stored in the data storage 136 and log information (first log information and second log information) obtained after the report is received. Details of the storage controller 140 are described later.

As described above, in the second embodiment, only first log information is stored in the SD card 133 at a regular interval while no change is detected in any monitored signal; and when a change in a monitored signal is detected, first information and second information obtained before and after the detection of the change are stored in the SD card 133.

Thus, according the second embodiment, even when the log storing interval is shortened, not all of obtained log information is stored in the SD card 133. That is, log information is stored at the shortened log storing interval only before and after the detection of a change in a monitored signal. Accordingly, the second embodiment makes it possible to prevent the SD card 133 from running out of storage capacity.

The second embodiment also makes it possible to obtain log information immediately before the detection of a change in a monitored signal at a short interval, and thereby makes it possible to more accurately analyze trouble based on log information.

Figure 12:
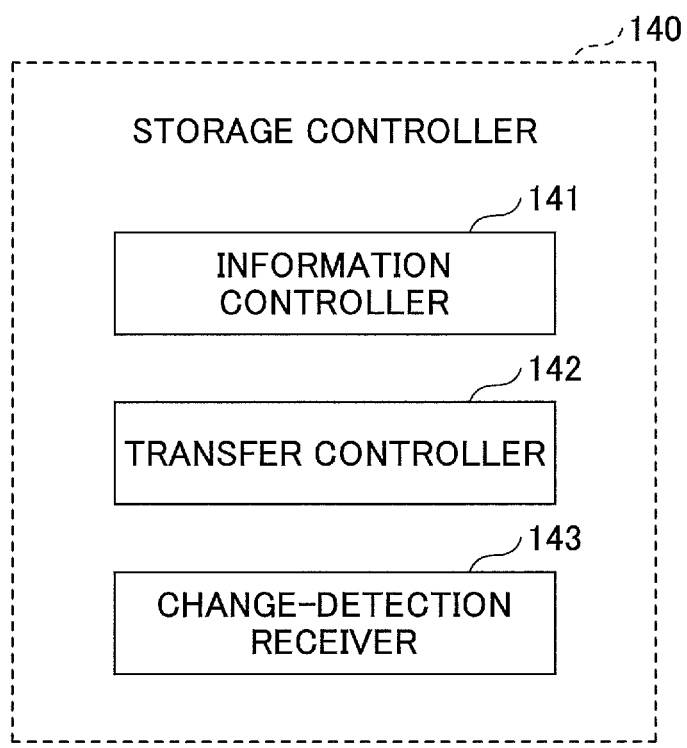
FIG. 12 is a block diagram illustrating functional components of a storage controller according to the second embodiment.

Next, functional components of the storage controller 140 are described with reference to FIG. 12. FIG. 12 is a block diagram illustrating functional components of the storage controller 140 according to the second embodiment. The storage controller 140 may include an information controller 141, a transfer controller 142, and a change-detection receiver 143.

The information controller 141 controls storage of log information obtained by the data acquirer 135A in the data storage 136.

When the amount of log information stored in the data storage 136 reaches a predetermined value, the information controller 141 deletes oldest log information in the data storage 136, and stores newly-obtained log information in the data storage 136. In other words, when the amount of log information stored in the data storage 136 reaches a predetermined value, the information controller 141 discards log information stored earliest in the data storage 136, and stores newly-obtained log information in the data storage 136.

More specifically, the information controller 141 keeps ten sets of past log information (or 10 ms of log information) in the data storage 136, and discards oldest log information when new log information is obtained. The number of sets of log information kept in the data storage 136 is not necessarily ten, and may be determined depending on the capacity of the RAM 134 implementing the data storage 136.

When a predetermined time period passes after the storing of log information in the data storage 136 is started, the transfer controller 142 transfers first log information stored in the data storage 136 to the SD card 133. In other words, the transfer controller 142 transfers log information other than log information of signals in the signal groups A through D to the SD card 133.

For example, each time a predetermined time period of 500 ms passes after the initial log information is stored in the data storage 136, the transfer controller 142 transfers only first log information to the SD card 133. In other words, every 500 ms, the transfer controller 142 transfers first log information stored in the data storage 136 to the SD card 133. Here, 500 ms is an example of the predetermined time period.

Further, when a log information transfer request is received from the change-detection receiver 143, the transfer controller 142 transfers, to the SD card 133, the log information already stored in the data storage 136 and log information stored in the data storage 136 after the log information transfer request is received. The change-detection receiver 143 sends the log information transfer request to the transfer controller 142 when a report indicating the detection of a change in a monitored signal is received.

More specifically, when a change in a monitored signal is detected, the transfer controller 142 transfers, to the SD card 133, first log information and a portion of second log information that is already stored in the data storage 136 and related to a group of signals corresponding to the monitored signal.

The transfer controller 142 also transfers, to the SD card 133, first log information and a portion of second log information that is obtained after the detection of the change in the monitored signal and related to a group of signals corresponding to the monitored signal.

For example, when a change in a monitored signal is detected, the transfer controller 142 transfers, to the SD card 133, ten sets of log information (which includes first log information and second log information of a group of signals corresponding to the monitored signal) already stored in the data storage 136. The transfer controller 142 also transfers, to the SD card 133, ten sets of log information (which includes first log information and second log information of the group of signals corresponding to the monitored signal) that are obtained after the change in the monitored signal is detected.

The change-detection receiver 143 receives a report indicating a change in a monitored signal from the signal monitor 137A, and sends a log information transfer request to the transfer controller 142 in response to the report. The report received by the change-detection receiver 143 may also include information indicating the monitored signal whose change is detected.

Figure 13:
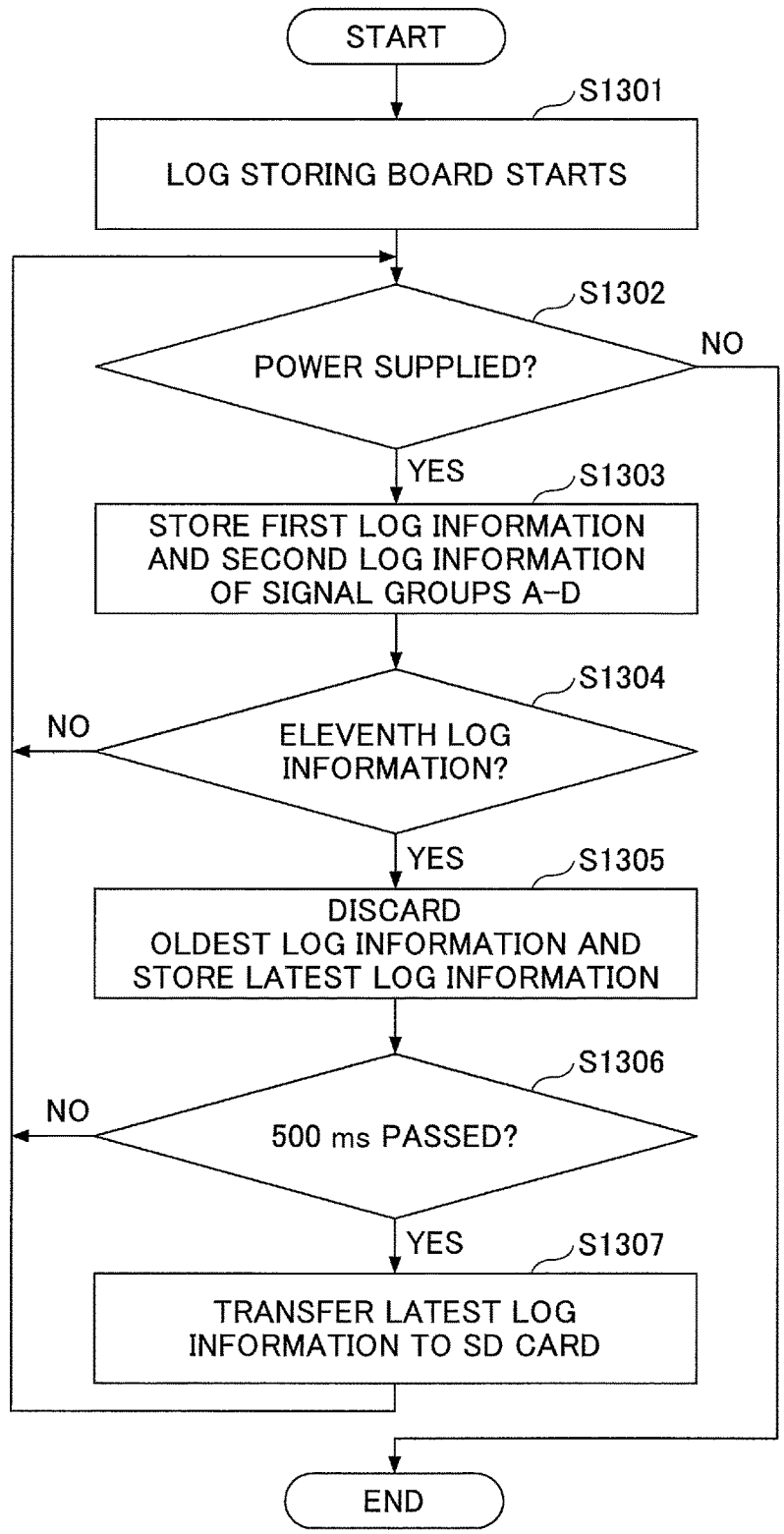
FIG. 13 is a flowchart illustrating an exemplary process performed by a storage controller according to the second embodiment.

Next, exemplary processes performed by the storage controller 140 are described with reference to FIGS. 13 and 14. FIG. 13 is a flowchart illustrating an exemplary process performed by the storage controller 140 according to the second embodiment.

When the log storing board 130 starts (step S1301), the storage controller 140 determines whether power is being supplied to the log storing board 130 (step S1302). When it is determined at step S1302 that power is not being supplied to the log storing board 130, the storage controller 140 ends the process.

When it is determined at step S1302 that power is being supplied to the log storing board 130, the information controller 141 obtains first log information and second log information of the signal groups A through D that are obtained by the data acquirer 135A, and stores log information obtained by combining the first log information and the second log information in the data storage 136 (step S1303).

Next, the information controller 141 determines whether the stored log information is the eleventh log information (which follows ten sets of log information) (step S1304). When it is determined at step S1304 that the stored log information is not the eleventh log information, the information controller 141 returns to step S1302.

When it is determined at step S1304 that the stored log information is the eleventh log information, the information controller 141 discards the oldest log information in the data storage 136, and keeps the eleventh log information in the data storage 136 (step S1305).

Next, the information controller 141 determines whether a predetermined time period (e.g., 500 ms) has passed after the storing of log information in the data storage 136 is started (step S1306). When it is determined at step S1306 that the predetermined time period has not passed, the process returns to step S1302.

When it is determined at step S1306 that the predetermined time period has passed, the transfer controller 142 transfers, to the SD card 133, the latest first log information in the log information stored in the data storage 136 (step S1307), and returns to step S1302.

Thus, in the second embodiment, first log information stored in the data storage 136 is transferred to the SD card 133 at an interval longer than the interval at which the data acquirer 135A obtains log information.

Figure 14:
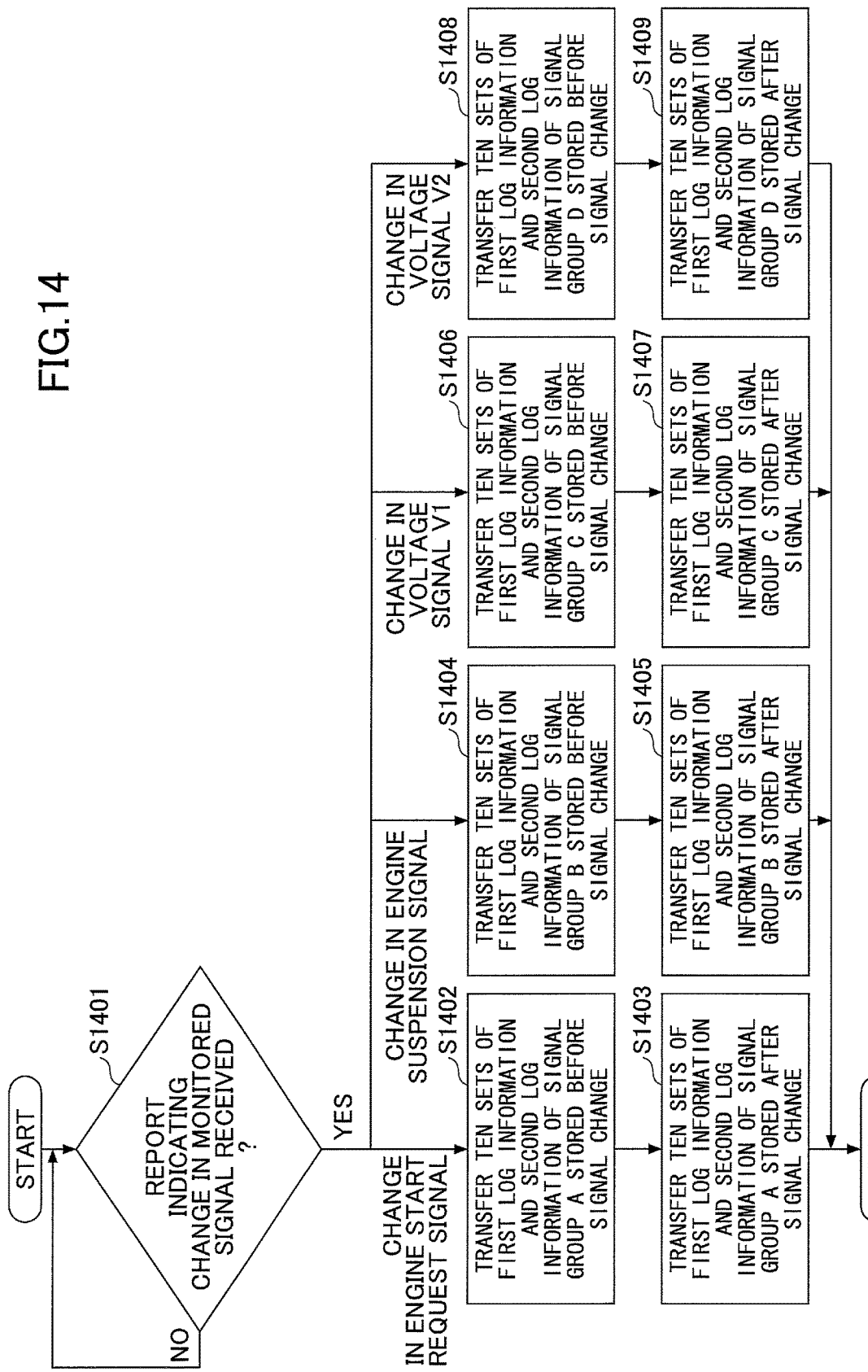
FIG. 14 is a flowchart illustrating another exemplary process performed by a storage controller according to the second embodiment.

FIG. 14 is a flowchart illustrating another exemplary process performed by the storage controller 140 according to the second embodiment. FIG. 14 illustrates a process performed by the storage controller 140 when a change in a monitored signal is detected. The storage controller 140 performs the process of FIG. 13 and the process of FIG. 14 as independent processes. The process of FIG. 14 is performed while the log storing board 130 is in operation.

The storage controller 140 determines whether a report indicating the detection of a change in one of the four monitored signals has been received by the change-detection receiver 143 (step S1401). When it is determined at step S1401 that no report has been received, the storage controller 140 waits for the reception of a report. The report indicating the detection of a change in one of the four monitored signals is sent by the signal monitor 137A to the storage controller 140 when the change is detected.

When it is determined at step S1401 that a report has been received, the storage controller 140 performs a process corresponding to the monitored signal (changed monitored signal) whose change is detected.

When the changed monitored signal is the engine start request signal, the transfer controller 142 of the storage controller 140 refers to the signal group table and transfers, to the SD card 133, second log information of the signal group A and first log information extracted from ten sets of log information already stored in the data storage 136 (step S1402).

Next, the transfer controller 142 transfers, to the SD card 133, second log information of the signal group A and first log information extracted from ten sets of log information that are stored in the data storage 136 after the reception of the report (step S1403), and ends the process.

When the changed monitored signal is the engine suspension signal, the transfer controller 142 of the storage controller 140 refers to the signal group table and transfers, to the SD card 133, second log information of the signal group B and first log information extracted from ten sets of log information already stored in the data storage 136 (step S1404).

Next, the transfer controller 142 transfers, to the SD card 133, second log information of the signal group B and first log information extracted from ten sets of log information that are stored in the data storage 136 after the reception of the report (step S1405), and ends the process.

When the changed monitored signal is the voltage signal V1, the transfer controller 142 of the storage controller 140 refers to the signal group table 61 and transfers, to the SD card 133, second log information of the signal group C and first log information extracted from ten sets of log information already stored in the data storage 136 (step S1406).

Next, the transfer controller 142 transfers, to the SD card 133, second log information of the signal group C and first log information extracted from ten sets of log information that are stored in the data storage 136 after the reception of the report (step S1407), and ends the process.

When the changed monitored signal is the voltage signal V2, the transfer controller 142 of the storage controller 140 refers to the signal group table and transfers, to the SD card 133, second log information of the signal group D and first log information extracted from ten sets of log information already stored in the data storage 136 (step S1408).

Next, the transfer controller 142 transfers, to the SD card 133, second log information of the signal group D and first log information extracted from ten sets of log information that are stored in the data storage 136 after the reception of the report (step S1409), and ends the process.

In the second embodiment, the transfer of second log information of a signal group and first log information to the SD card 133 in the process of FIG. 14 takes priority over the transfer of first log information to the SD card 133 in the process of FIG. 13.

That is, in the second embodiment, when the timing of transferring second log information of a signal group and first log information to the SD card 133 in the process of FIG. 14 coincides with the timing of transferring first log information to the SD card 133 in the process of FIG. 13, the transferring of the second log information and the first log information of FIG. 14 is given priority.

Figure 15:
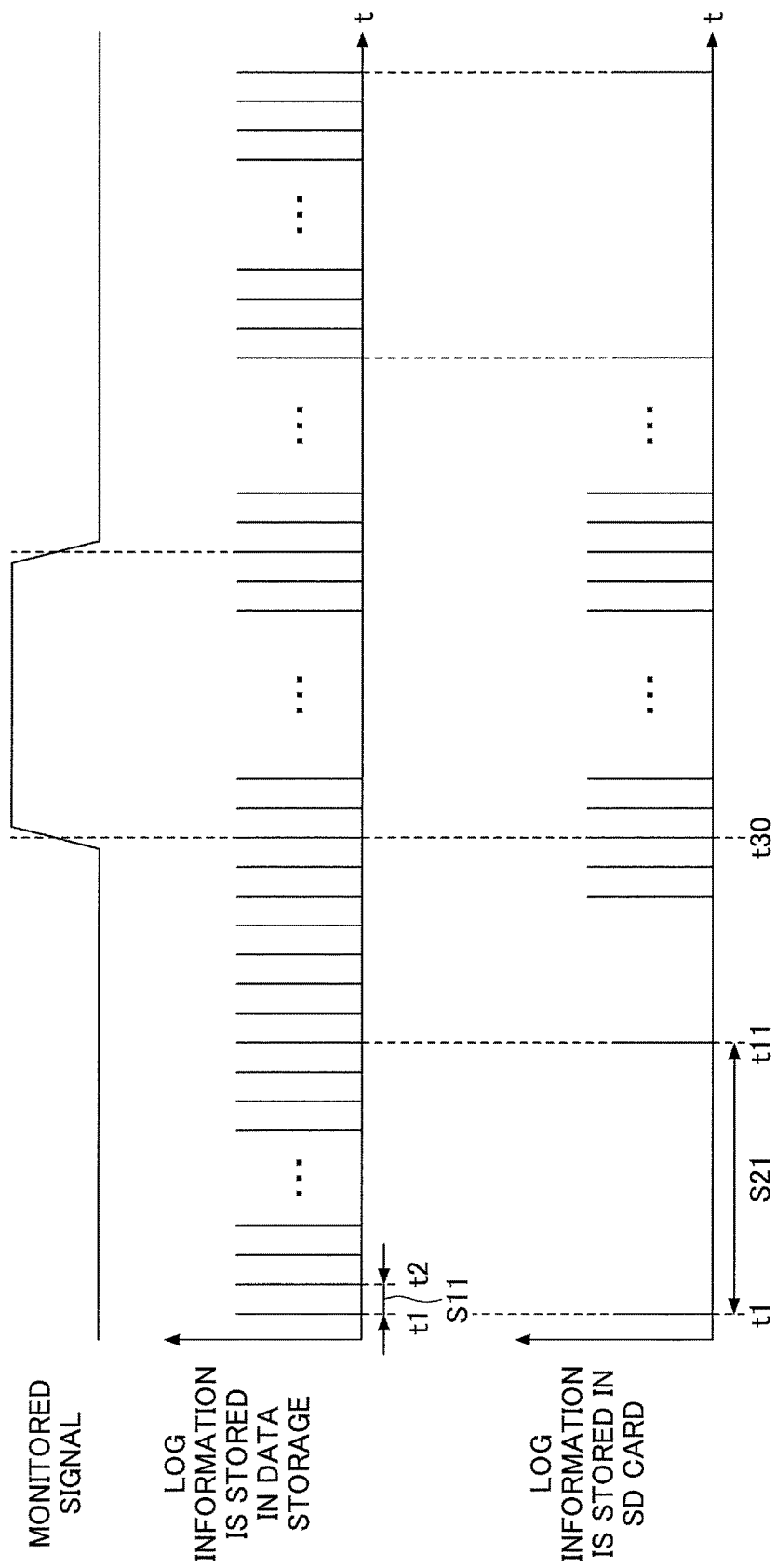
FIG. 15 is a timing chart illustrating exemplary log storing intervals according the second embodiment.

Next, a log storing interval of the second embodiment is described with reference to FIG. 15. FIG. 15 is a timing chart illustrating an exemplary log storing interval according to the second embodiment.

In FIG. 15, it is assumed that a change is detected in one of the four monitored signals at a time t30.

In FIG. 15, the interval between a time t1 and a time t2 represents a log storing interval (predetermined interval) S11 at which the data acquirer 135A obtains log information. Also in FIG. 15, the interval between the time t1 and a time t11 represents a transfer interval (predetermined time period) S21 at which the transfer controller 142 transfers first log information from the data storage 136 to the SD card 133.

In the second embodiment, log information is stored in the data storage 136 at the predetermined interval S11. Then, when the predetermined time period S21 passes after the time t1, first log information is transferred from the data storage 136 to the SD card 133.

Accordingly, in the second embodiment, not all of log information obtained by the data acquirer 135A is stored in the SD card 133. This in turn makes it possible to reduce the amount of log information stored in the SD card 133.

Also in the second embodiment, when a change is detected in a monitored signal at the time t30, the transfer controller 142 transfers ten sets of log information stored in the data storage 136 to the SD card 133 regardless of whether the predetermined time period S21 has passed from the previous transfer of first log information. More specifically, when a change in a monitored signal is detected, the transfer controller 142 transfers, to the SD card 133, ten sets of first log information already stored in the data storage 136 and ten sets of second log information already stored in the data storage 136 and related to a signal group corresponding to the monitored signal.

The transfer controller 142 also transfers, to the SD card 133, ten sets of first log information stored in the data storage 136 after the time t30 and ten sets of second log information stored in the data storage 136 after the time t30 and related to the signal group corresponding to the monitored signal.

Thus, in the second embodiment, before and after the timing when a change in a monitored signal is detected, first log information and second log information are transferred to the SD card 133 at an interval shorter than the interval at which only first log information is transferred to the SD card 133. Accordingly, the second embodiment makes it possible to store more detailed log information in a time period before and after the detection of a change in a monitored signal than in a time period where no change is detected in any monitored signal, and makes it possible to obtain log information that is useful for analyzing circumstances where trouble has occurred.

In the above embodiments, the RAM 134 implementing the data storage 136 is provided in the CPU 131. However, the present invention is not limited to the these embodiments. For example, a memory implementing the data storage 136 may be provided outside of the CPU 131.

An electronic apparatus, a log storing method, and an image forming apparatus according to embodiments of the present invention are described above. However, the present invention is not limited to the specifically disclosed embodiments, and variations and modifications may be made without departing from the scope of the present invention.

What is claimed is:

1. An electronic apparatus, comprising:
    a signal monitor configured to monitor monitored signals and detect a change in a changed monitored signal of the monitored signals, the monitored signals including signals for controlling a start of a processor and signals indicating status of power supply to the electronic apparatus;
    a data acquirer configured to obtain first log information of the processor at a first interval before the change in the changed monitored signal is detected by the signal monitor; and
    a storage controller configured to store the first log information obtained at the first interval in a storage device,
    wherein when the change in the changed monitored signal is detected by the signal monitor, the storage controller changes the first interval to a second interval shorter than the first interval, and stores the first log information obtained by the data acquirer at the second interval in the storage device.

2. The electronic apparatus according to claim 1, wherein the first log information includes at least one of information indicating a history of communications of the processor and information indicating a history of operations of the processor.

3. The electronic apparatus according to claim 1, wherein groups of signals are associated with the monitored signals;
the data acquirer is configured to capture one of the groups of signals associated with the changed monitored signal as second log information, and
when the change in the changed monitored signal is detected by the signal monitor, the storage controller stores the second log information in the storage device.

4. The electronic apparatus as claimed in claim 3, further comprising:
a data storage configured to store the first log information and the second log information; and
a transfer controller configured to transfer the first log information and the second log information stored in the data storage to the storage device.

5. The electronic apparatus as claimed in claim 4, further comprising:
an information controller configured to control storage of log information including the first log information and the second log information in the data storage, wherein
when an amount of the log information stored in the data storage reaches a predetermined value, the information controller discards oldest log information of the log information stored in the data storage and stores newly-obtained log information in the data storage; and
the transfer controller transfers the log information stored in the data storage to the storage device every predetermined time period.

6. The electronic apparatus according to claim 3, wherein the one of the groups of signals include the changed monitored signal and one or more of the other monitored signals that possibly change in association with the changed monitored signal.

7. The electronic apparatus as claimed in claim 3, wherein when the change in the changed monitored signal is detected by the signal monitor, the storage controller stores the second log information in the storage device at the second interval shorter than the first interval.

8. The electronic apparatus as claimed in claim 3, wherein after capturing the second log information at the second interval for a predetermined time period, the data acquirer stops capturing the second log information.

9. The electronic apparatus according to claim 1, wherein after storing the first log information obtained at the second interval for a predetermined time period, the storage controller changes the second interval back to the first interval used before the change is detected.

10. The electronic apparatus according to claim 1, wherein
the signals for controlling the start of the processor include a start request signal for requesting the processor to start and a suspension signal for suspending an operation of the processor; and
the signals indicating the status of power supply include a first voltage signal indicating an output of a first power source for supplying power to the data acquirer and a second voltage signal indicating an output of a second power source for supplying power to the processor.

11. The electronic apparatus according to claim 10, wherein each of the first voltage signal and the second voltage signal includes an analog signal and a digital signal.

12. The electronic apparatus as claimed in claim 1, wherein the electronic apparatus includes
a first board including the processor; and
a second board including the data acquirer, the signal monitor, and the storage device.

13. A method performed by an electronic apparatus, the method comprising:
monitoring monitored signals and detecting a change in a changed monitored signal of the monitored signals by a central processing unit of the electronic apparatus, the monitored signals including signals for controlling a start of a processor of the electronic apparatus and signals indicating status of power supply to the electronic apparatus;
obtaining first log information of the processor at a first interval before the change in the changed monitored signal is detected;
storing the first log information obtained at the first interval in a storage device; and
when the change in the changed monitored signal is detected,
changing the first interval to a second interval shorter than the first interval,
obtaining the first log information at the second interval, and
storing the first log information obtained at the second interval in the storage device.

14. An image forming apparatus, comprising:
a signal monitor configured to monitor monitored signals and detect a change in a changed monitored signal of the monitored signals, the monitored signals including signals for controlling a start of an engine and signals indicating status of power supply to the image forming apparatus;
a data acquirer configured to obtain first log information of the engine at a first interval before the change in the changed monitored signal is detected by the signal monitor; and
a storage controller configured to store the first log information obtained at the first interval in a storage device,
wherein when the change in the changed monitored signal is detected by the signal monitor, the storage controller changes the first interval to a second interval shorter than the first interval, and stores the first log information obtained by the data acquirer at the second interval in the storage device.

* * * * *